United States Patent
Sakomizu

(10) Patent No.: US 10,356,424 B2
(45) Date of Patent: Jul. 16, 2019

(54) IMAGE PROCESSING DEVICE, RECORDING MEDIUM, AND IMAGE PROCESSING METHOD

(71) Applicant: Oki Electric Industry Co., Ltd., Tokyo (JP)

(72) Inventor: Kazuhito Sakomizu, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 232 days.

(21) Appl. No.: 15/178,204

(22) Filed: Jun. 9, 2016

(65) Prior Publication Data

US 2017/0064337 A1 Mar. 2, 2017

(30) Foreign Application Priority Data

Aug. 26, 2015 (JP) ................................. 2015-166836

(51) Int. Cl.
*G06K 9/38* (2006.01)
*H04N 19/176* (2014.01)
(Continued)

(52) U.S. Cl.
CPC ............. *H04N 19/176* (2014.11); *G06K 9/38* (2013.01); *H04N 19/119* (2014.11);
(Continued)

(58) Field of Classification Search
CPC .... H04N 19/21; H04N 19/124; H04N 19/176; H04N 19/40; H04N 19/513;
(Continued)

(56) References Cited

U.S. PATENT DOCUMENTS 9,319,738 B2* 4/2016 Li ....................... H04N 21/4363
9,769,500 B1* 9/2017 Leroux .................. H04N 19/85
(Continued)

FOREIGN PATENT DOCUMENTS

JP H04-219089 A 8/1992
JP 2002135779 A 5/2002
(Continued)

OTHER PUBLICATIONS

Wallace, Gregory, "Overview of the JPEG still image compression standard," Proceedings of SPIE (1990).*
(Continued)

*Primary Examiner* — Jayanti K Patel
*Assistant Examiner* — Shadan E Haghani
(74) *Attorney, Agent, or Firm* — Rabin & Berdo, P.C.

(57) ABSTRACT

There is provided an image processing device including: a preprocessing unit configured to perform preprocessing for reducing an amount of information of an input image to generate a preprocessed image and supply the preprocessed image to an encoding processing unit that encodes and outputs the preprocessed image, wherein the preprocessing unit includes a transformation unit configured to divide the input image into predetermined blocks, perform transformation processing with a predetermined method, and generate transform blocks, a block-of-interest determination unit configured to hold region information indicating a region of interest or a non region of interest of the input image and determine whether or not each transform block is a block of interest on the basis of the region information, and an information amount reduction unit.

14 Claims, 8 Drawing Sheets

(51) Int. Cl.
*H04N 19/85* (2014.01)
*H04N 19/124* (2014.01)
*H04N 19/167* (2014.01)
*H04N 19/119* (2014.01)
*H04N 19/122* (2014.01)

(52) U.S. Cl.
CPC ......... *H04N 19/122* (2014.11); *H04N 19/124* (2014.11); *H04N 19/167* (2014.11); *H04N 19/85* (2014.11)

(58) Field of Classification Search
CPC .. H04N 19/119; H04N 19/122; H04N 19/146; H04N 19/167; H04N 19/17; H04N 19/182; H04N 19/85; G01R 31/31855; G06K 9/00288; G06K 9/00771; G06K 9/38
See application file for complete search history.

(56) References Cited

U.S. PATENT DOCUMENTS

| | | | |
|---|---|---|---|
| 2002/0051580 A1 | 5/2002 | Yamada et al. | |
| 2009/0202169 A1* | 8/2009 | Hayashi | G06T 3/4092 382/264 |
| 2010/0119156 A1 | 5/2010 | Noguchi et al. | |
| 2011/0199389 A1* | 8/2011 | Lu | G06F 3/017 345/619 |
| 2012/0044422 A1 | 2/2012 | Peacock et al. | |
| 2014/0010289 A1* | 1/2014 | Lukasik | H04N 19/119 375/240.08 |
| 2016/0021373 A1* | 1/2016 | Queru | H04N 19/136 382/239 |
| 2016/0127738 A1* | 5/2016 | Su | H04N 19/147 375/240.12 |

FOREIGN PATENT DOCUMENTS

| | | |
|---|---|---|
| JP | 2009-049979 A | 3/2009 |
| JP | 2009188792 A | 8/2009 |
| JP | 2011205602 A | 10/2011 |
| JP | 2013539276 A | 10/2013 |
| JP | 2014216831 A | 11/2014 |
| JP | 2015033055 A | 2/2015 |

OTHER PUBLICATIONS

"MPEG-4 AVC/H.264 codec technology explanation," available at https://pro-av.panasonic.net/en/sales_o/p2/concept/img/technology.pdf, uploaded Jan. 29, 2009.*

Bauschke, "Recompression of JPEG Images by Requantization," IEEE Transactions on Image Processing, vol. 12, No. 7, Jul. 2003. (Year: 2003).*

* cited by examiner

IMAGE PROCESSING DEVICE, RECORDING MEDIUM, AND IMAGE PROCESSING METHOD

CROSS REFERENCE TO RELATED APPLICATION(S)

This application is based upon and claims benefit of priority from Japanese Patent Application No. 2015-166836, filed on Aug. 26, 2015, the entire contents of which are incorporated herein by reference.

BACKGROUND

An embodiment of the present invention relates to an image processing device, a recording medium and an image processing method, and is applicable to, for example, encoding processing (compression processing) of images forming a video.

In recent years, surveillance camera systems have been diffused, and it is desired to further improve a frame rate, resolution, and multi-viewpoint. However, when the frame rate, the resolution, and the multi-viewpoint are improved in surveillance camera systems, an amount of data of a video is increased, which results in increase in communication costs and storage costs. In order to ease this problem, conventionally, for example, JP H04-219089A proposes a method in which a face region is detected from a video of a human image and a large number of bits are allocated to compress the face region.

Conventionally, JP H04-219089A and JP 2009-49979A propose to reduce an amount of information by performing filtering with the use of a low pass filter in a region other than a region of interest to thereby remove high frequency components.

A device disclosed in JP H04-219089A further compresses an image whose high frequency components have been removed by performing filtering with the use of a low pass filter in a region other than a region of interest on the basis of an input image and region-of-interest information indicating the region of interest (compresses the image by using a method such as JPEG, H.264, or H.265) and therefore outputs a stream of a video.

A device disclosed in JP 2009-49979A employs a configuration that reduces an amount of information in a non region of interest by controlling a parameter to be applied to a compression unit that performs image compression.

SUMMARY

The device disclosed in JP H04-219089A attains an effect of suppressing generation of artifacts in a block boundary while reducing the amount of information by using the low pass filter. Reduction in high frequency components using the low pass filter disclosed in JP H04-219089A corresponds to processing in which the whole image is converted into a frequency domain and then amplitude of high frequency components is reduced. However, in many conventional image compression methods (video compression methods), an image is converted into a frequency domain for each block and is then compressed, and therefore, even if amplitude of high frequency components is reduced to zero in the whole image by using a low pass filter, the amplitude of the high frequency components is not securely zero in the frequency domain for each block. For this reason, the conventional image compression methods can suppress generation of artifacts. However, for example, quality of the whole video is not so important in the case of a surveillance camera image, which is different from the case of an entertainment video. That is, in the case where artifacts are not a significant problem as in the surveillance camera image, it tends to be more important to effectively and securely reduce an amount of data.

As in the device disclosed in JP 2009-49979A, when the amount of information is reduced by using a function provided by the compression unit, it is possible to effectively and securely reduce an amount of data. However, this presupposes that the above function is mounted on the compression unit. Even in the case where a device based on a standard of conventional video compression processing has a function of controlling quality in each region, the function is not actually mounted in some cases. In particular, it is difficult to add the function in the case where the compression unit is provided as hardware.

In view of the above problem, it is desired to provide an image processing device, a recording medium, and an image processing method which, when preprocessing of each image forming a video is performed, can effectively reduce an amount of information without depending on processing content of subsequent compression processing.

An image processing device according to a first embodiment of the present invention includes: (1) a preprocessing unit configured to perform preprocessing for reducing an amount of information of an input image to generate a preprocessed image and supply the preprocessed image to an encoding processing unit that encodes and outputs the preprocessed image. (2) The preprocessing unit includes (2-1) a transformation unit configured to divide the input image into predetermined blocks, perform transformation processing with a predetermined method, and generate transform blocks, (2-2) a block-of-interest determination unit configured to hold region information indicating a region of interest or a non region of interest of the input image and determine whether or not each transform block is a block of interest on the basis of the region information, and (2-3) an information amount reduction unit configured to reduce an amount of information of the non block of interest that has not been determined as the block of interest in the input image and output the input image as an information-amount-reduced image.

A computer-readable recording medium having an image processing program according to a second embodiment of the present invention recorded thereon, the image processing program for causing a computer to function as (1) a preprocessing unit configured to perform preprocessing for reducing an amount of information of an input image to generate a preprocessed image and supply the preprocessed image to an encoding processing unit that encodes and outputs the preprocessed image. (2) The preprocessing unit includes (2-1) a transformation unit configured to divide the input image into predetermined blocks, perform transformation processing with a predetermined method, and generate transform blocks, (2-2) a block-of-interest determination unit configured to hold region information indicating a region of interest or a non region of interest of the input image and determine whether or not each transform block is a block of interest on the basis of the region information, and (2-3) an information amount reduction unit configured to reduce an amount of information of the non block of interest that has not been determined as the block of interest in the input image and output the input image as an information-amount-reduced image.

According to a third embodiment of the present invention, in an image processing method, (1) a preprocessing unit is provided, (2) the preprocessing unit performs preprocessing for reducing an amount of information of an input image to generate a preprocessed image and supplies the preprocessed image to an encoding processing unit that encodes and outputs the preprocessed image, and (3) the preprocessing unit includes (3-1) a transformation unit configured to divide the input image into predetermined blocks, perform transformation processing with a predetermined method, and generate transform blocks, (3-2) a block-of-interest determination unit configured to hold region information indicating a region of interest or a non region of interest of the input image and determine whether or not each transform block is a block of interest on the basis of the region information, and (3-3) an information amount reduction unit configured to reduce an amount of information of the non block of interest that has not been determined as the block of interest in the input image and output the input image as an information-amount-reduced image.

According to an embodiment of the present invention, it is possible to provide an image processing device which, when preprocessing of each image forming a video is performed, effectively reduces an amount of information without depending on processing content of subsequent compression processing.

DETAILED DESCRIPTION OF THE EMBODIMENT(S)

Figure 1:
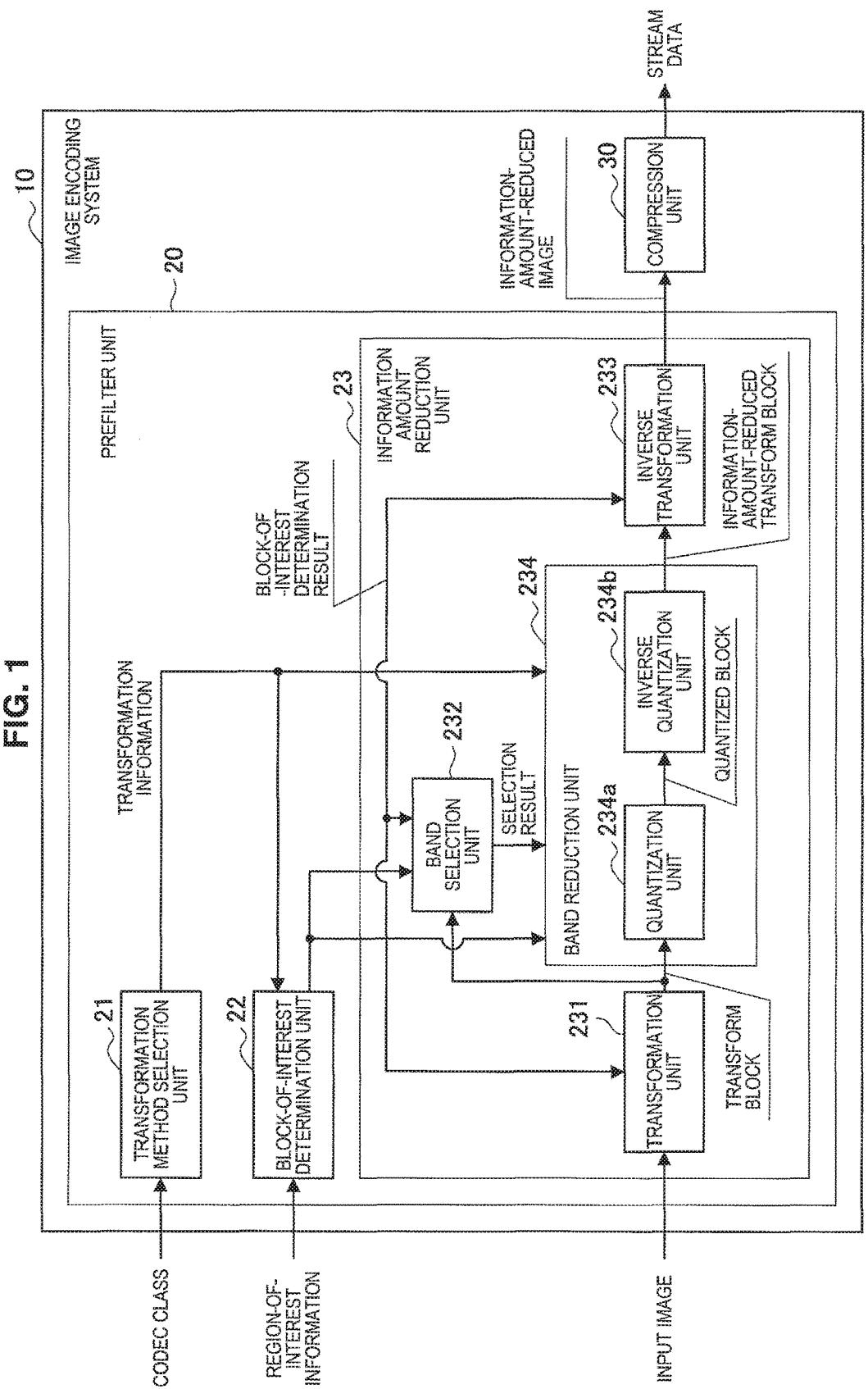
FIG. 1 is a block diagram showing a functional configuration of an image encoding system according to Embodiment 1.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) Embodiment 1

Hereinafter, Embodiment 1 of an image processing device, a program, and an image processing method according to an embodiment of the present invention will be described in detail with reference to the drawings. Hereinafter, there will be described an example where the image processing device, the program, and the image processing method according to the embodiment of the present invention are applied to an image encoding system.

(A-1) Configuration of Embodiment 1

FIG. 1 is a block diagram showing a functional configuration of an image encoding system 10 according to Embodiment 1.

Every time when an input image (data of the input image) is input, the image encoding system 10 performs compression processing (encoding processing) on the input image and performs processing for outputting the input image as stream data. At the time of the compression processing of the input image, the image encoding system 10 uses, as additional information, region-of-interest information in which a region having a high degree of interest (degree of importance) is described and information containing a codec class in which a compression method (encoding method) used at the time of performing the compression processing (encoding processing) at a subsequent stage is described. That is, the image encoding system 10 accepts input of the input image together with the additional information and performs the compression processing of the input image by using the additional information.

The region-of-interest information is information indicating an important region such as a region of a face part of a human in the case where an input image is, for example, a surveillance camera image. Although a description format of the region-of-interest information is not limited, for example, data showing whether or not each pixel is a region of interest may be applied. Although a supply source of the region-of-interest information is not limited, for example, a recognition result of a face region of a human, which is generated in a surveillance camera system including the image encoding system 10, may be applied.

A description format of the codec class (encoding class information) is also not limited, but is, for example, information indicating any one of a plurality of predetermined codecs (encoding methods) such as "JPEG" and "H.264/AVC" (specific data format is not limited). A configuration of the supply source of the codec class is not limited. For example, content set in advance may be supplied, information based on user setting may be supplied, or information may be supplied from a compression unit 30 described below.

The image encoding system 10 roughly includes a prefilter unit 20 serving as a preprocessing unit and the compression unit 30 serving as an encoding processing unit.

The image encoding system 10 may be achieved by, for example, installing a program (an image processing program according to the embodiment) in a computer (an implementation configuration of the program) including a processor and a memory. Further, a part or all of structural elements of the image encoding system 10 may be configured by using hardware (for example, a dedicated semiconductor chip and a dedicated electric circuit).

The prefilter unit 20 performs preprocessing for reducing an amount of information on input information on the basis of an input image, region-of-interest information, and a codec class, thereby generating an information-amount-reduced image.

The compression unit 30 performs processing for compressing the information-amount-reduced image with a predetermined compression method (encoding method) (for example, compressing (encoding) the information-amount-reduced image with a compression method (encoding method) such as JPEG, H.264, or H.265) and outputting the information-amount-reduced image as stream data (bitstream).

The prefilter unit 20 includes a transformation method selection unit 21, a block-of-interest determination unit 22, and an information amount reduction unit 23.

The transformation method selection unit 21 obtains a transformation method and a block size on the basis of the codec class and outputs the transformation method and the block size as transformation information.

The block-of-interest determination unit 22 determines whether or not a transform block is a block of interest on the basis of the region-of-interest information and the transformation method and outputs a block-of-interest determination result.

The information amount reduction unit 23 reduces an amount of information of a non block of interest that does not include a region of interest on the basis of the transformation information, the block-of-interest determination result, and the input image and outputs the information-amount-reduced image.

The information amount reduction unit 23 includes a transformation unit 231, a band selection unit 232, an inverse transformation unit 233, and a band reduction unit 234.

The transformation unit 231 divides the input image by a block size based on the transformation information on the basis of the input image and the transformation information, performs transformation based on the transformation information, and outputs a transform block.

The band selection unit 232 selects a band in which the amount of information is to be reduced in the block size based on the transformation information on the basis of the transformation information, the block-of-interest determination result, and the transform block and outputs the band transformation information as a selection result.

The inverse transformation unit 233 performs inverse transformation based on the transformation information on the basis of the transformation information and an information-amount-reduced block and outputs the information-amount-reduced image.

When the block-of-interest determination result indicates that the transform block is a non block of interest, the band reduction unit 234 reduces the amount of information of the transform block on the basis of the selection result in the block size based on the transformation information on the basis of the block-of-interest determination result, the transform block, and the selection result and outputs an information-amount-reduced transform block. Note that, in this embodiment, the transformation information is added as input information in order to notify the band reduction unit 234 of the block size of the transform block. However, the band reduction unit 234 may be notified by inserting information on the block size to data of the transform block.

The band reduction unit 234 includes a quantization unit 234a and an inverse quantization unit 234b.

When the block-of-interest determination result indicates that the transform block is a non block of interest, the quantization unit 234a reduces the amount of information by quantizing the transform block on the basis of the selection result in the block size based on the transformation information by using the transformation information, the block-of-interest determination result, the transform block, and the selected band and outputs a quantized block.

When the block-of-interest determination result indicates that the transform block is a non block of interest, the inverse quantization unit 234b performs inverse quantization on the quantized block on the basis of the selection result in the block size based on the transformation information by using the transformation information, the block-of-interest determination result, the selected band, and the quantized block and therefore outputs the information-amount-reduced transform block.

(A-2) Operation of Embodiment 1

Figure 2:
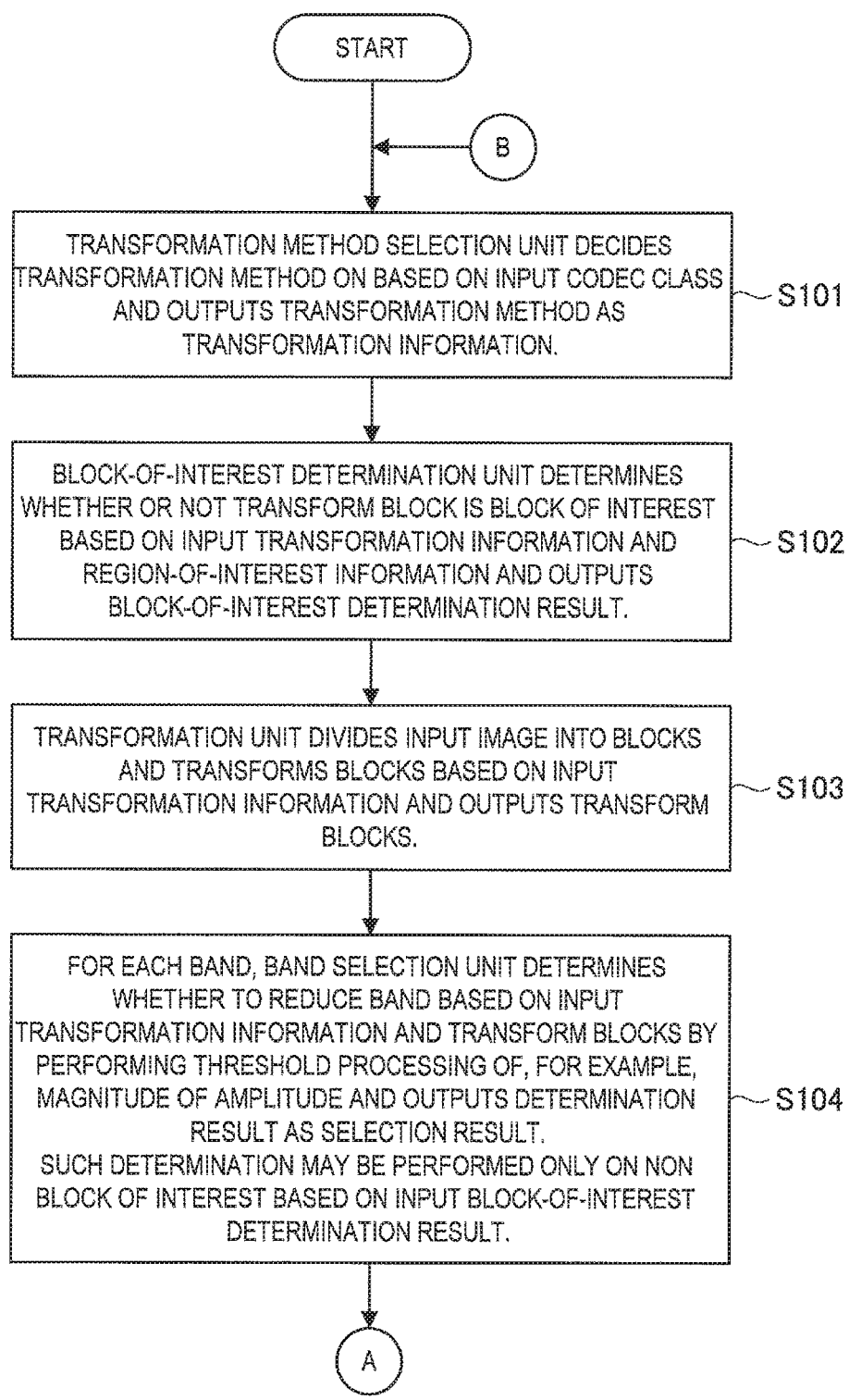
FIG. 2 is a (first) flowchart showing operation of the image encoding system according to Embodiment 1.
Figure 3:
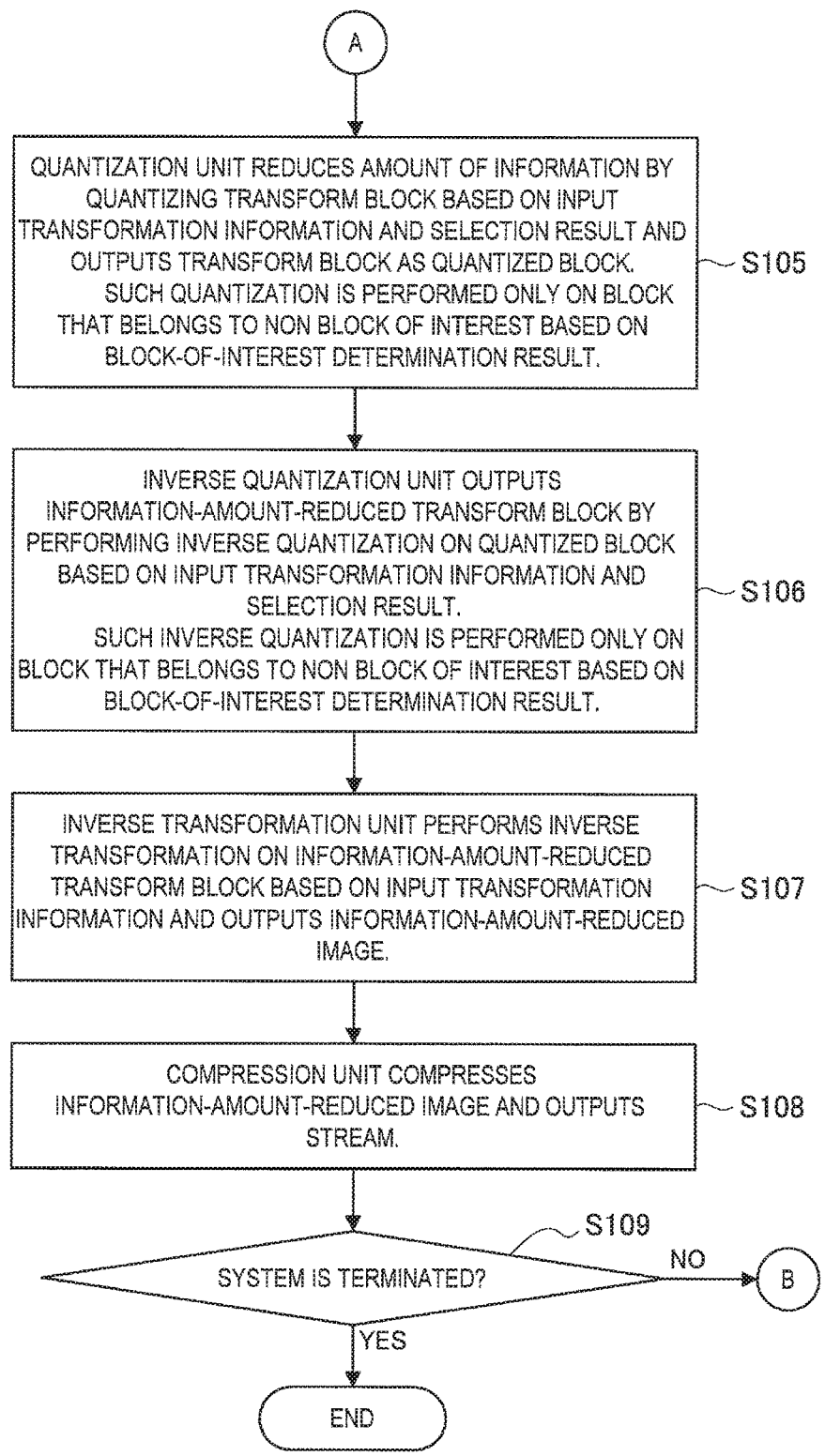
FIG. 3 is a (second) flowchart showing operation of the image encoding system according to Embodiment 1.

Next, operation of the image encoding system 10 having the above configuration in Embodiment 1 (an image processing method according to the embodiment) will be described with reference to FIG. 2 and FIG. 3.

First, the transformation method selection unit 21 decides a transformation method on the basis of an input codec class and outputs the transformation method as transformation information (S101).

In the case where the codec class is, for example, "JPEG", the transformation method selection unit 21 outputs, as the transformation information, a transformation method of discrete cosine transform (DCT) and a predetermined block size (for example, block size of 8×8). Further, in the case where the codec class is, for example, H.264/AVC, the transformation method selection unit 21 outputs, as the transformation information, a transformation method of integer conversion and a predetermined block size (for example, block size of 4×4). In the transformation method selection unit 21, for example, transformation information (transformation method) corresponding to the codec class may be registered in advance.

Then, the block-of-interest determination unit 22 determines whether or not each transform block (each block having a block size specified in the transformation information) forming an input image is a block of interest (a transform block including a pixel of interest) on the basis of the input transformation information and region-of-interest information and outputs a block-of-interest determination result (S102).

Next, an example of a determination method for each transform block forming the input image (a method of determining whether the transform block is a block of interest or a non block of interest) in the block-of-interest determination unit 22 will be described with reference to FIG. 4.

Hereinafter, a pixel included in a region of interest in each transform block will be referred to as "region-of-interest pixel".

The method of determining whether each transform block is a block of interest or a non block of interest (whether or not each transform block is a block of interest) in the block-of-interest determination unit 22 is not limited. For example, a transform block in which one region-of-interest pixel alone is included may be determined as a block of interest, only a transform block in which half the pixels or more are region-of-interest pixels may be determined as a block of interest, or only a transform block in which all the pixels are region-of-interest pixels may be determined as a block of interest.

Figure 4:
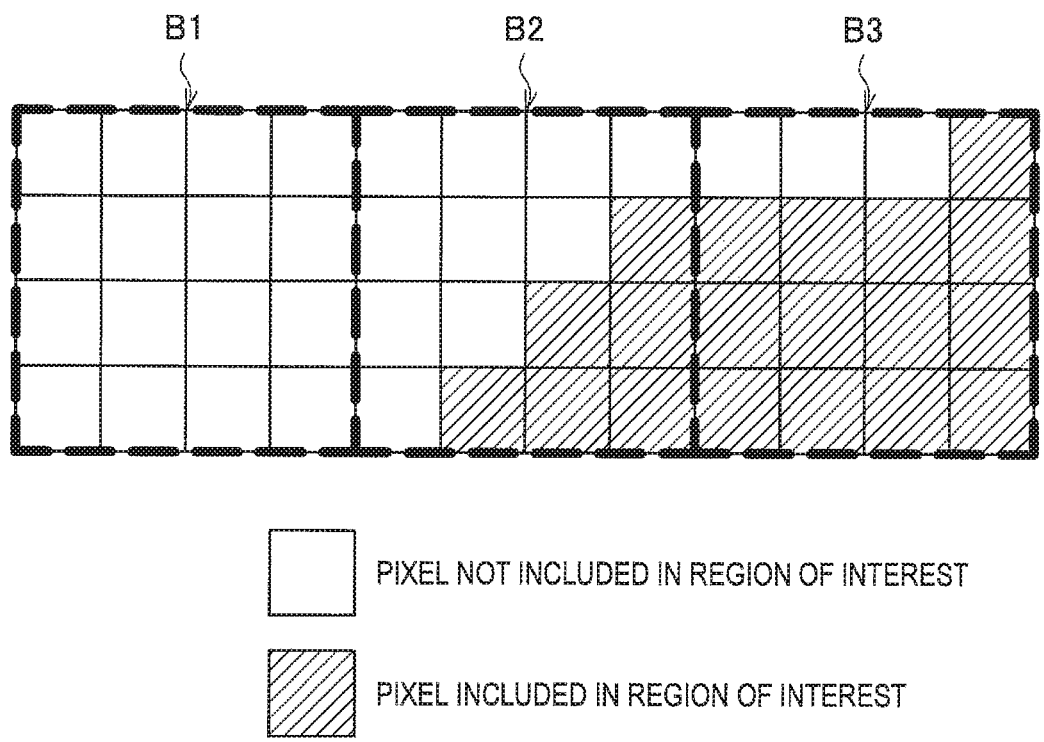
FIG. 4 is an explanatory diagram illustrating an example of a determination method of a block-of-interest determination unit according to Embodiment 1.

FIG. 4 illustrates three transform blocks B1 to B3 each of which has a block size of 4×4 (16 pixels in total). As illustrated in FIG. 4, the transform block B1 includes no pixel that belongs to a region of interest. The transform block B2 includes 6 pixels that belong to the region of interest. The transform block B3 includes 13 pixels that belong to the region of interest.

For example, herein, in the case where the following rule "only a transform block in which half the pixels or more are region-of-interest pixels is determined as a block of interest" is applied, the block-of-interest determination unit 22 determines that only the transform block B3 is a block of interest.

Then, the transformation unit 231 divides the input image into blocks on the basis of the transformation information, performs transformation processing in each block on the basis of the transformation information, and outputs transform blocks (S103).

In the case where, for example, DCT of 8×8 is specified as the transformation information, the transformation unit 231 divides the input image into 8×8 blocks and performs DCT in each block. Further, for example, in the case where integer conversion of 4×4 is specified as the transformation information, the transformation unit 231 divides the input image into 4×4 blocks and performs integer conversion in each block.

Then, for each band, the band reduction unit 234 determines whether to reduce the band on the basis of the input transformation information and the transform blocks. Then, the band reduction unit 234 outputs a selection result indicating whether to reduce each band (S104).

Note that the band reduction unit 234 may determine whether to reduce each band only in a non block of interest.

A policy (rule) to select a band to be reduced by the band reduction unit 234 is not limited. The band reduction unit 234 may employ a policy to select, as the band to be reduced, for example, information corresponding to high frequency components having a predetermined frequency or a higher frequency. Further, the band reduction unit 234 may employ a policy to select, as the band to be reduced, for example, a band having amplitude smaller than a threshold decided in advance. Furthermore, the band reduction unit 234 may employ, for example, both the above policy "to select, as the band to be reduced, information corresponding to high frequency components having a predetermined frequency or a higher frequency" and the policy "to select, as the band to be reduced, a band having amplitude smaller than a threshold decided in advance".

Then, the quantization unit 234a reduces an amount of information by quantizing each transform block on the basis of the input transformation information and the selection result and outputs each transform block as a quantized block (S105). The quantization unit 234a may perform, only on a non block of interest, processing for reducing the amount of information by quantizing each transform block on the basis of the input transformation information and the selection result.

A specific procedure in which the quantization unit 234a performs quantization is not limited. The quantization unit 234a may employ, for example, a "method of quantizing a specified band by using a quantization step width decided in advance" or a "method of quantizing a specified band by using a quantization step width that is as wide as high frequency components".

Then, the inverse quantization unit 234b performs inverse quantization on the quantized block on the basis of the transformation information and the selection result and therefore outputs an information-amount-reduced transform block (S106). The inverse quantization may be performed only on a block that belongs to a non block of interest on the basis of the block-of-interest determination result.

Then, the inverse transformation unit 233 performs inverse transformation on the information-amount-reduced transform block on the basis of the input transformation information and outputs an information-amount-reduced image (S107).

Then, the compression unit 30 compresses the information-amount-reduced image and outputs a stream (S108).

Then, the image encoding system 10 (prefilter unit 20, compression unit 30) determines whether to terminate the system (for example, presence/absence of the next input image) (S108), and, only in the case where the system is not terminated (for example, the next input image is present), processing returns to Step S101 and processing of the next frame is performed.

(A-3) Effect of Embodiment 1

According to Embodiment 1, the following effect can be attained.

The image encoding system 10 (prefilter unit 20) in Embodiment 1 performs appropriate prefiltering (information reduction processing; preprocessing) on an input image on the basis of an input codec class. With this, the image encoding system 10 (prefilter unit 20) in Embodiment 1 can effectively and securely reduce an amount of information in a non region of interest by performing the appropriate prefiltering in accordance with a compression method (encoding method) of the compression unit 30 (without depending on the compression method).

(B) Embodiment 2

Hereinafter, Embodiment 2 of an image processing device, a program, and an image processing method according to an embodiment of the present invention will be described in detail with reference to the drawings. Hereinafter, there will be described an example where the image processing device, the program, and the image processing method according to an embodiment of the present invention are applied to an image encoding system.

(B-1) Configuration of Embodiment 2

Figure 5:
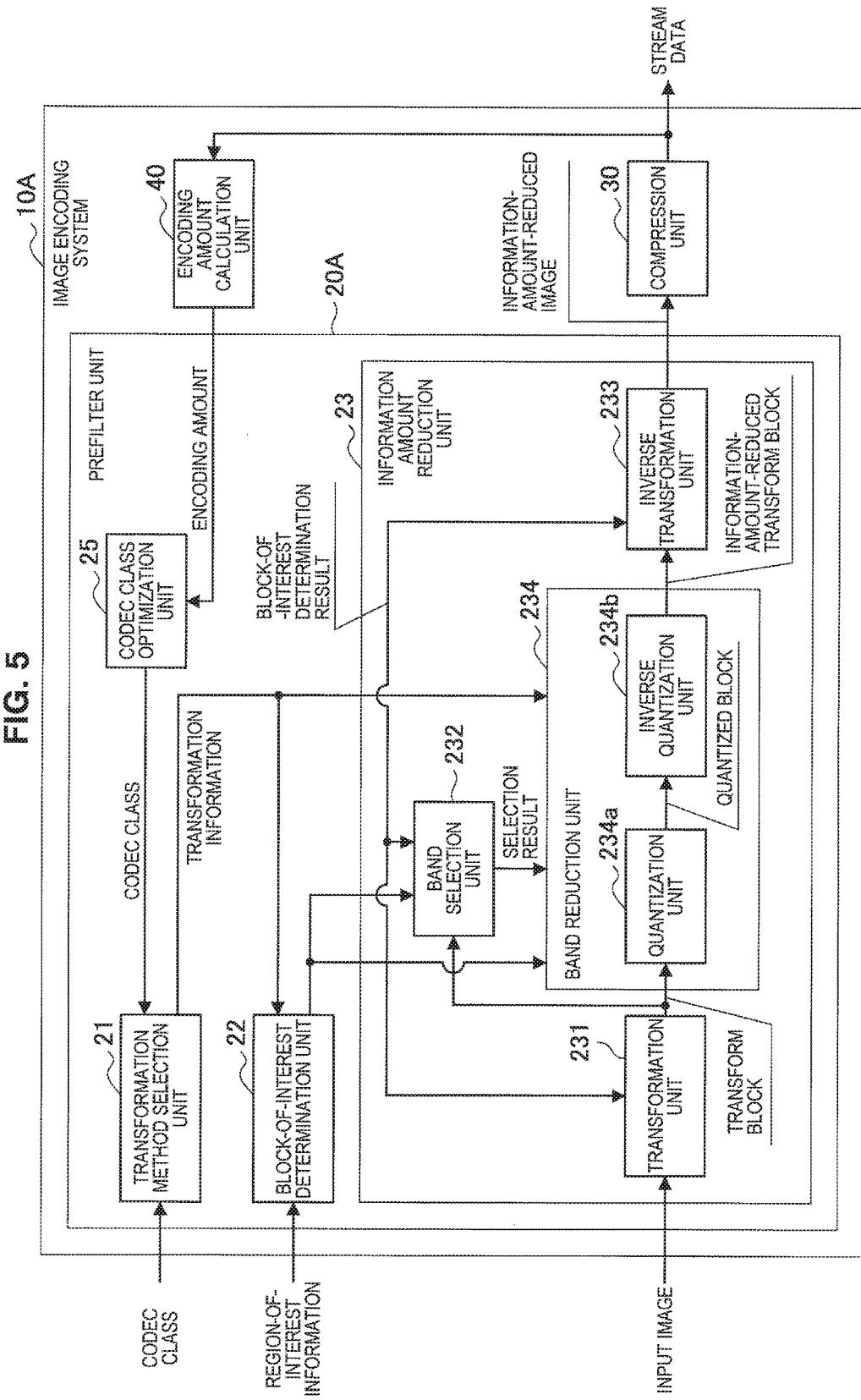
FIG. 5 is a block diagram showing a functional configuration of an image encoding system according to Embodiment 2.

FIG. 5 is a block diagram showing a functional configuration of an image encoding system 10A according to Embodiment 2, and the same parts as or the parts corresponding to the parts in FIG. 1 are denoted with the same or corresponding reference numerals.

Hereinafter, a difference between the image encoding system 10A in Embodiment 2 and the image encoding system in Embodiment 1 will be described.

In the image encoding system 10A, the prefilter unit 20 is replaced by a prefilter unit 20A, and an encoding amount calculation unit 40 is added. Further, a codec class optimization unit 25 is added in the prefilter unit 20A.

The encoding amount calculation unit 40 calculates an encoding amount on the basis of a stream output by the compression unit 30.

The codec class optimization unit 25 obtains an optimal codec class and supplies the obtained codec class to the transformation method selection unit 21.

That is, although the image encoding system 10 (prefilter unit 20) in Embodiment 1 presupposes that information on a codec class is supplied from an external device, in the image encoding system 10A (prefilter unit 20A) in Embodiment 2, an internal device (codec class optimization unit 25) decides an optimal codec class instead of receiving supply of information on a codec class from an external device.

The codec class optimization unit 25 receives feedback (supply) of the encoding amount calculated in the encoding amount calculation unit 40 and obtains an optimal codec class on the basis of the supplied encoding amount. For example, the codec class optimization unit 25 decides, as the optimal codec class, a codec class that minimizes encoding amounts (an encoding amount per frame) from a plurality of options of codec classes (for example, JPEG and H.264/AVC). The codec class optimization unit 25 may decide the optimal codec class (a codec class that minimizes encoding amounts) by monitoring a change in the fed-back encoding amount while switching the codec classes to be supplied to the transformation method selection unit 21.

For example, the codec class optimization unit 25 may acquire encoding amounts for a predetermined number of frames (amounts of data for respective frames) for each of the plurality of corresponding codec classes and decide, as the optimal codec class, a codec class that minimizes the encoding amount per frame (an average value of the encoding amounts). Specifically, the codec class optimization unit 25 may decide, as the optimal codec class, a codec class that minimizes encoding amounts by, for example, outputting JPEG as a codec class to acquire encoding amounts for a predetermined number of frames and then switching a codec class to be output to H.264/AVC to similarly acquire encoding amounts for a predetermined number of frames.

Even after the optimal codec class is decided once, the codec class optimization unit 25 may decide an optimal codec class (decide the optimal codec class by processing similar to the original processing) again at a regular timing or an irregular timing (a timing at which an event in which, for example, the compression unit 30 or a distribution destination is changed occurs). In the case where, for example, the change in the encoding amount is monitored and the encoding amount is increased, the codec class optimization unit 25 may decide an optimal codec class again (decide the optimal codec class by processing similar to the original processing).

The order of switching the codec classes when the codec class optimization unit 25 decides the optimal codec class may be the order set in advance or may be the order based on setting or the like performed by a user (for example, system manager).

(B-2) Operation of Embodiment 2

Figure 6:
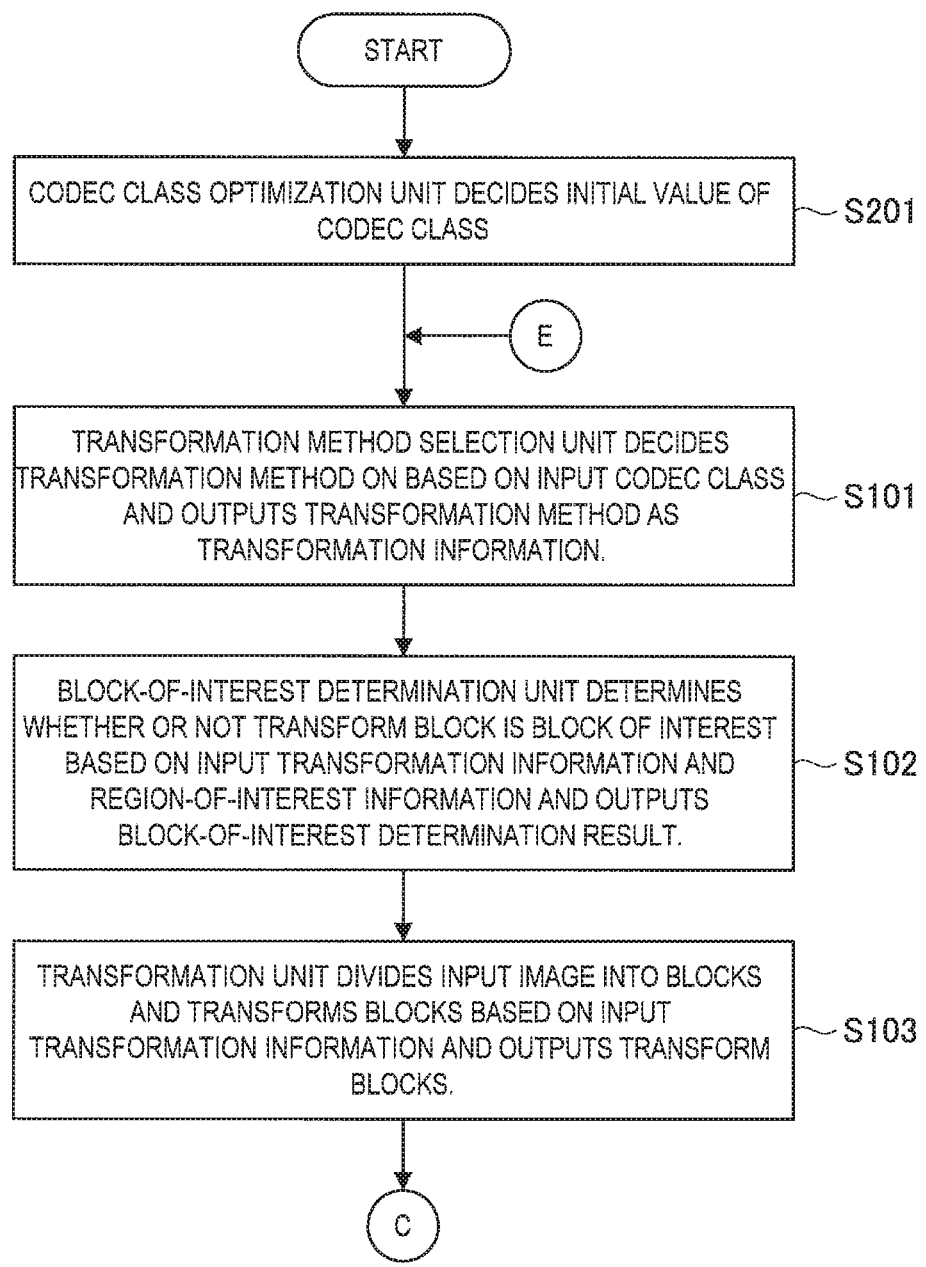
FIG. 6 is a (first) flowchart showing operation of the image encoding system according to Embodiment 2.
Figure 7:
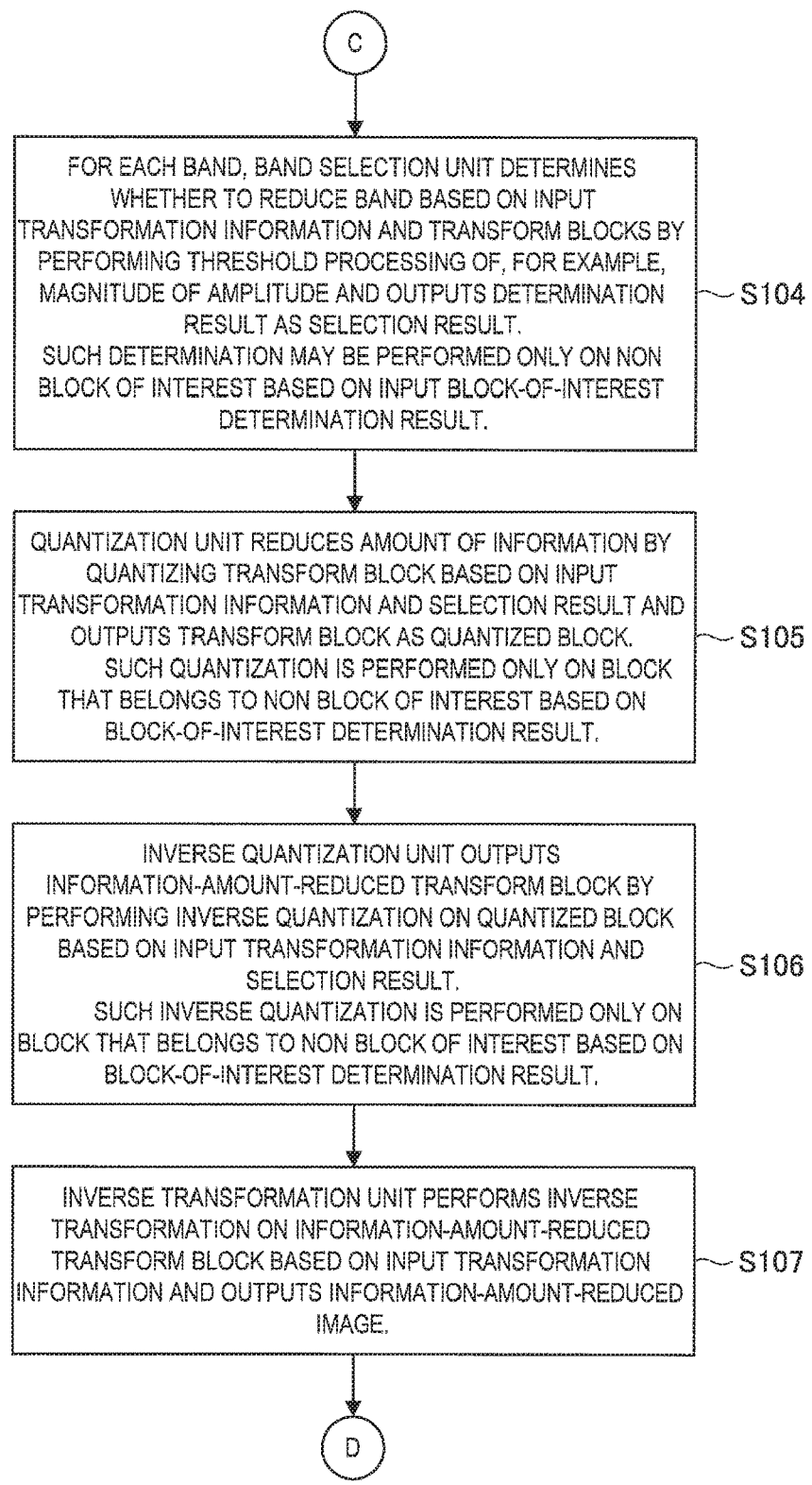
FIG. 7 is a (second) flowchart showing operation of the image encoding system according to Embodiment 2.
Figure 8:
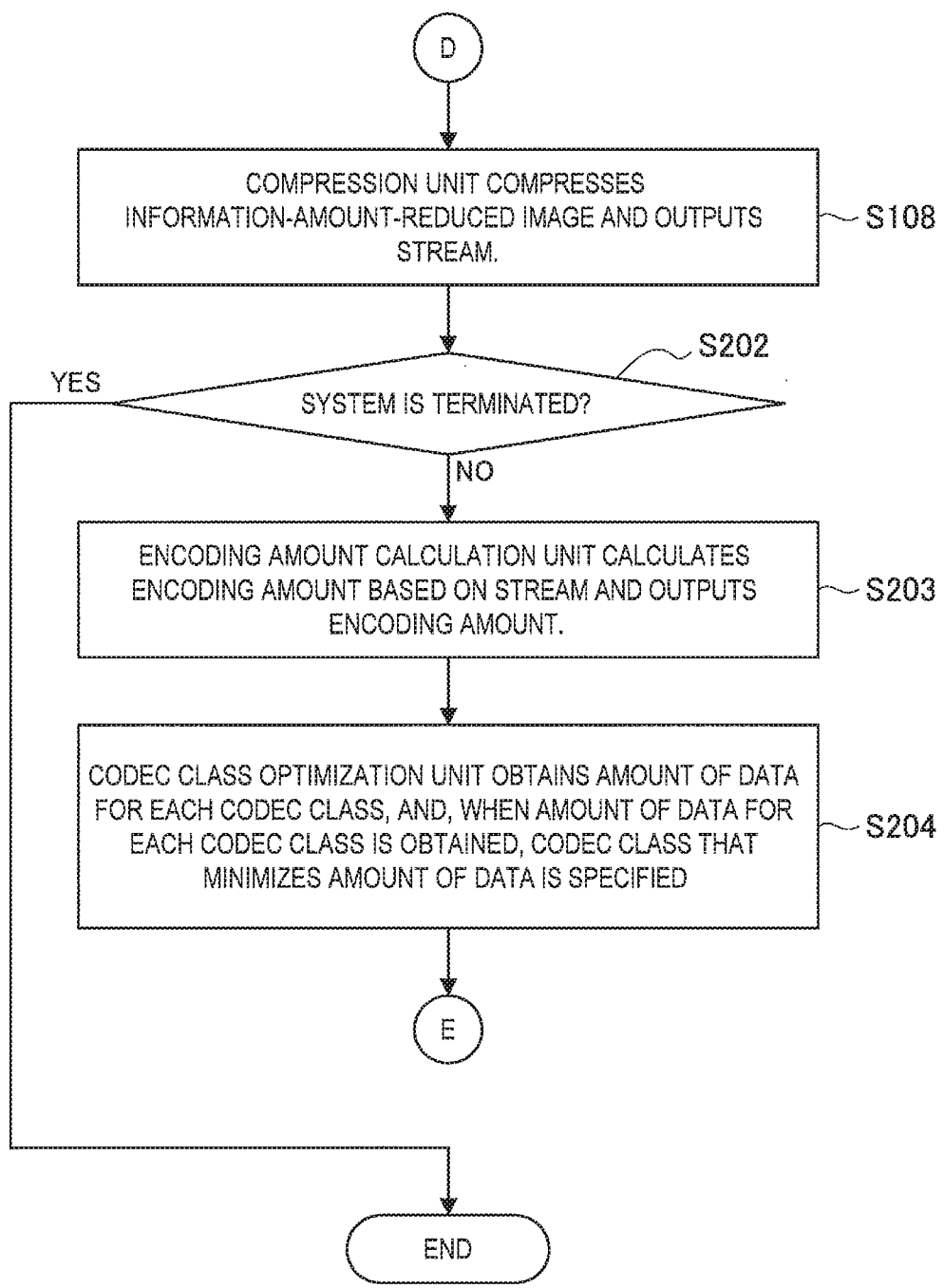
FIG. 8 is a (third) flowchart showing operation of the image encoding system according to Embodiment 2.

Next, an operation example of the image encoding system 10A in Embodiment 2 having the above configuration will be described with reference to FIG. 6 to FIG. 8. In FIG. 6 to FIG. 8, processing similar to the processing in Embodiment 1 (FIG. 2, FIG. 3) is denoted with the same step numbers (reference numerals). Hereinafter, a difference between the image encoding system 10A in Embodiment 2 and the image encoding system in Embodiment 1 will be mainly described.

First, an initial value of a codec class is decided and is supplied to the transformation method selection unit 21 by the codec class optimization unit 25 (S201). The initial value of the codec class in the codec class optimization unit 25 may be, for example, an arbitrary value set by a user (for example, system manager). Operation based on the codec class supplied from the codec class optimization unit 25 is performed in the transformation method selection unit 21.

Thereafter, an input image and region-of-interest information are supplied to the prefilter unit 20A, and preprocessing (information amount reduction processing) and compression processing (encoding processing) are executed in the same way as Embodiment 1 (Steps S101 to S108).

Then, the image encoding system 10A (prefilter unit 20A, compression unit 30) determines whether to terminate the system (S202), and, only in the case where the system is not terminated, the processing proceeds to Step S203 described below.

In the case where the system is not terminated, the encoding amount calculation unit 40 calculates an encoding amount (the encoding amount for one frame) on the basis of stream data output from the compression unit 30 and supplies the encoding amount to the codec class optimization unit 25 (S203). A calculation method of the encoding amount performed by the encoding amount calculation unit 40 is not limited. For example, the encoding amount calculation unit 40 may count an amount of data (for example, calculate the byte number or the bit number by using a counter) for one frame output from the compression unit 30 or may grasp the amount of data for one frame on the basis of information itself indicating the encoding amount embedded in the stream data.

Then, the codec class optimization unit 25 receives supply of information on the encoding amount from the encoding amount calculation unit 40, determines a codec class to be applied to the next frame (input image), and supplies information on the codec class based on a determination result to the transformation method selection unit 21 (S204). A specific example of determination processing in the codec class optimization unit 25 has been described as in "(B-1) Configuration of Embodiment 2" described above.

Then, in the image encoding system 10A, the processing returns to processing of Step 101 and proceeds to processing of the next frame (input image).

(B-3) Effect of Embodiment 2

According to Embodiment 2, the following effect can be attained in addition to the effect of Embodiment 1.

In the image encoding system 10A (prefilter unit 20A) in Embodiment 2, the codec class optimization unit 25 determines an optimal codec class on the basis of an encoding amount supplied from the encoding amount calculation unit 40. With this, in Embodiment 2, appropriate prefiltering (information amount reduction processing) can be performed in the prefilter unit 20A even in the case where a codec matched with the compression unit 30 is unknown or a codec used in the compression unit 30 is dynamically changed.

(C) Other Embodiments

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

(C-1) In the second example, an encoding amount to be input to the codec class optimization unit is calculated in the encoding amount calculation unit in the image encoding system on the basis of a stream output by the compression unit. However, an effect of an embodiment of the present invention can be obtained even in the case of, for example, "a configuration in which a compression function is provided in a remote location and an encoding amount of a stream is obtained from the compression function in the remote location" or "a configuration in which a stream of the compression unit is compressed again with a different compression method in a remote location and an encoding amount of the stream after being compressed again is obtained".

(C-2) In each of the above embodiments, the configuration in which region-of-interest information is input to the prefilter unit has been described. However, a configuration in which information on a non region of interest is input may be employed.

(C-3) In each of the above embodiments, the description has been provided assuming that the information amount reduction unit, the transformation unit, and the inverse transformation unit perform processing such as reduction in information and transformation on all blocks. However, the processing may be performed only on a non region of interest. In this case, because processing is not performed on a region of interest, it is possible to obtain a reduction effect of an operation amount, an effect of preventing deterioration of image quality caused by transformation, and other effects.

(C-4) In each of the above embodiments, an example where the image processing device in an embodiment of the present invention is applied to the image encoding system including the compression unit and the prefilter unit has been described. However, the image processing device in an embodiment of the present invention may be achieved as a device including only the prefilter unit. Even in the case where the image processing device in an embodiment of the present invention includes only the prefilter unit, it is possible to obtain an effect of emphasizing a region of interest and other effects.

(C-5) In each of the above embodiments, only in the case where a block is a non block of interest on the basis of a block-of-interest determination result in the band reduction unit, the block-of-interest determination result is input to the band reduction unit. However, determination processing on whether to reduce a band may be performed in all blocks without inputting the block-of-interest determination result.

(C-6) The band reduction unit in each of the embodiments may reduce information by setting a band specified on the basis of a selection result to certain values including zero.

(C-7) In each of the above embodiments, transformation information is added as input information in order to notify the quantization unit and the inverse quantization unit of a block size of a transform block. However, the quantization unit and the inverse quantization unit may be notified by inserting information on the block size to data of the transform block.

(C-8) In each of the above embodiments, the description has been provided assuming that transformation information is generated by the transformation method selection unit. However, the block-of-interest determination unit and the band reduction unit may be operated on the basis of transformation information decided in advance.

(C-9) In each of the above embodiments, in the case where, for example, a block-of-interest determination result shows a non block of interest, the information amount reduction unit 23 may generate an information-amount-reduced image by obtaining a representative value such as an average value or a mode value in a block and filling the block with the representative value.

What is claimed is:

1. An image processing device comprising a processor configured to implement:
    a preprocessing unit configured to perform preprocessing for reducing an amount of information of an input image to generate a preprocessed image and supply the preprocessed image to an encoding processing unit that encodes and outputs the preprocessed image,
    wherein the preprocessing unit includes
        a transformation unit configured to divide the input image into predetermined blocks, perform transformation processing with a predetermined method, and generate transform blocks,
        a block-of-interest determination unit configured to hold region information indicating a region of interest or a non region of interest of the input image and determine whether or not each transform block is a block of interest on the basis of the region information, and
        an information amount reduction unit configured to reduce an amount of information of a non block of interest that has not been determined as the block of interest in the input image and output the input image as an information-amount-reduced image, the information amount reduction unit including an inverse quantization unit configured to perform inverse quantization on a quantized block corresponding to the non block of interest; and
    a compression unit configured to compress the information-amount-reduced image with a predetermined compression method.

2. The image processing device according to claim 1, wherein the block-of-interest determination unit determines whether or not each transform block is the block of interest or the non block of interest in accordance with an amount of pixels that belong to the region of interest.

3. The image processing device according to claim 1, the preprocessing unit further comprising:
    a transformation method selection unit configured to decide a transformation method of the transformation unit on the basis of encoding class information on an encoding method matched with the encoding processing unit,
    wherein the transformation unit performs the transformation processing with a block size based on a selection result of the transformation method selection unit and generates the transform blocks.

4. The image processing device according to claim 3, the processor being further configured to implement:
    an encoding class optimization unit configured to obtain optimal encoding class information and supply the obtained encoding class information to the transformation method selection unit,
    wherein the transformation method selection unit decides a transformation method of the transformation unit on the basis of the encoding class information supplied from the encoding class optimization unit.

5. The image processing device according to claim 4, wherein the encoding class optimization unit collects an encoding amount output by the encoding processing unit and obtains optimal encoding class information on the basis of the collected encoding amount.

6. The image processing device according to claim 5, wherein the encoding class optimization unit collects the encoding amount for each piece of the encoding class information to be supplied to the transformation method selection unit and obtains the optimal encoding class information.

7. The image processing device according to claim 6, wherein the encoding class optimization unit collects the encoding amount for each piece of the encoding class information to be supplied to the transformation method selection unit and determines, as the optimal encoding class information, the encoding class information that minimizes the encoding amount.

8. The image processing device according to claim 1, wherein the information amount reduction unit obtains a representative value of pixel values in the non block of interest and replaces each pixel in the non block of interest with the representative value.

9. The image processing device according to claim 1, the information amount reduction unit further comprising:
    a band selection unit configured to select a band in which an amount of information is to be reduced,
    wherein the information amount reduction unit performs, on the non block of interest, processing for reducing the amount of information in the band selected by the band selection unit.

10. The image processing device according to claim 9, wherein the band selection unit selects a high frequency component having a predetermined frequency or a higher frequency.

11. The image processing device according to claim 9, wherein the band selection unit selects the band to be reduced from a component included in the non block of interest.

12. The image processing device according to claim 9, wherein the information amount reduction unit reduces the amount of information by setting the band specified by a selection result to a certain value including zero.

13. A computer-readable recording medium having an image processing program recorded thereon, the image processing program for causing a computer to function as
a preprocessing unit configured to perform preprocessing for reducing an amount of information of an input image to generate a preprocessed image and supply the preprocessed image to an encoding processing unit that encodes and outputs the preprocessed image,
wherein the preprocessing unit includes
a transformation unit configured to divide the input image into predetermined blocks, perform transformation processing with a predetermined method, and generate transform blocks,
a block-of-interest determination unit configured to hold region information indicating a region of interest or a non region of interest of the input image and determine whether or not each transform block is a block of interest on the basis of the region information, and
an information amount reduction unit configured to reduce an amount of information of a non block of interest that has not been determined as the block of interest in the input image and output the input image as an information-amount-reduced image, the information amount reduction unit including an inverse quantization unit configured to perform inverse quantization on a quantized block corresponding to the non block of interest, and
a compression unit configured to compress the information-amount-reduced image with a predetermined compression method.

14. An image processing method,
wherein a preprocessing unit is provided,
wherein the preprocessing unit performs preprocessing for reducing an amount of information of an input image to generate a preprocessed image and supplies the preprocessed image to an encoding processing unit that encodes and outputs the preprocessed image, and
wherein the preprocessing unit includes
a transformation unit configured to divide the input image into predetermined blocks, perform transformation processing with a predetermined method, and generate transform blocks,
a block-of-interest determination unit configured to hold region information indicating a region of interest or a non region of interest of the input image and determine whether or not each transform block is a block of interest on the basis of the region information, and
an information amount reduction unit configured to reduce an amount of information of a non block of interest that has not been determined as the block of interest in the input image and output the input image as an information-amount-reduced image, the information amount reduction unit including an inverse quantization unit configured to perform inverse quantization on a quantized block corresponding to the non block of interest, and
wherein a compression unit configured to compress the information-amount-reduced image with a predetermined compression method is further provided.

* * * * *